United States Patent
Dey et al.

(10) Patent No.: US 10,002,454 B2
(45) Date of Patent: Jun. 19, 2018

(54) REACTIVE OVERLAYS OF MULTIPLE REPRESENTATIONS USING AUGMENTED REALITY

(71) Applicant: INTERNATIONAL BUSINESS MACHINES CORPORATION, Armonk, NY (US)

(72) Inventors: Prasenjit Dey, Bangalore (IN); Sharad C. Sundararajan, Hopewell Junction, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days. days.

(21) Appl. No.: 15/268,290

(22) Filed: Sep. 16, 2016

(65) Prior Publication Data

US 2018/0082451 A1    Mar. 22, 2018

(51) Int. Cl.
    G06T 11/60      (2006.01)
    G06F 3/0484     (2013.01)
    G06T 19/00      (2011.01)

(52) U.S. Cl.
    CPC .......... *G06T 11/60* (2013.01); *G06F 3/04845* (2013.01); *G06T 19/006* (2013.01)

(58) Field of Classification Search
    None
    See application file for complete search history.

(56) References Cited

U.S. PATENT DOCUMENTS

| | | |
|---|---|---|
| 8,549,439 B2 | 10/2013 | Howard |
| 8,624,921 B2 | 1/2014 | McGreevy et al. |
| 8,732,592 B2 | 5/2014 | Nielsen et al. |
| 8,839,121 B2 | 9/2014 | Bertolami et al. |
| 8,902,254 B1 | 12/2014 | Laughlin et al. |
| 9,189,880 B2 | 11/2015 | Small |
| 2003/0006986 A1 | 1/2003 | Dick et al. |
| 2013/0290876 A1 | 10/2013 | Anderson et al. |
| 2014/0204119 A1 | 7/2014 | Malamud et al. |
| 2014/0310595 A1 | 10/2014 | Acharya et al. |
| 2015/0254882 A1 | 9/2015 | Englert et al. |
| 2015/0262427 A1 | 9/2015 | Kuranoshita |

OTHER PUBLICATIONS

Dunleavy et al., "Affordances and Limitations of Immersive Participatory Augmented Reality Simulations for Teaching and Learning," Journal of Science Education and Technology, vol. 18, pp. 7-22, Springer Science-Business Media, LLC, Sep. 3, 2008.

(Continued)

*Primary Examiner* — Michelle Chin
(74) *Attorney, Agent, or Firm* — Intelletek Law Group, PLLC; Gabriel Daniel, Esq.

(57) ABSTRACT

A computer system, method, and computer readable product are provided for conveying multiple representations of a concept to a user via augmented reality, with a mechanism to easily move between these multiple representations along multiple axes. In various embodiments, an augmented reality image is generated and displayed by a computing device. The augmented reality image may then be modified in response to user input along multiple axes, such as complexity, depth, or variety of a concept being conveyed with the augmented reality image.

17 Claims, 9 Drawing Sheets

(56) References Cited

OTHER PUBLICATIONS

Epp et al., "Uncertainty Representation in Visualizations of Learning Analytics for Learners: Current Approaches and Opportunities," IEEE Transactions on Learning Technologies, vol. 8, No. 3, pp. 242-260, Jul.-Sep. 2015.
Fotis Liarokapis, "An Augmented Reality Interface for Visualizing and Interacting with Virtual Content," Virtual Reality, vol. 11, pp. 23-43, Springer-Verlag London Limited, Nov. 9, 2006.
Kurkovsky et al., "Current Issues in Handheld Augmented Reality," 2012 International Conference on Communications and Information Technology (ICCIT), Hammamet, Tunisia, Jun. 26-28, 2012.
Mendez et al., "Interactive Context-Driven Visualization Tools for Augmented Reality," 5th IEEE and ACM International Symposium on Mixed and Augmented Reality (ISMAR06), pp. 209-218, Santa Barbara, California, Oct. 22-25, 2006.
Shen et al., "A Framework for Multiple-View Product Representation Using Augmented Reality" IEEE 2006 International Conference on Cyberworlds (CW'06), Lausanne, Switzerland, Nov. 28-29, 2006.
van Krevelen et al., "A Survey of Augmented Reality Technologies, Applications and Limitations," International Journal of Virtual Reality, vol. 9, pp. 1-20, Jan. 26, 2010.
Yue Qi, "3D Modeling and Augmented Reality," 4th International Universal Communication Symposium (IUCS 2010), Beijing, China, Oct. 18-19, 2010.

REACTIVE OVERLAYS OF MULTIPLE REPRESENTATIONS USING AUGMENTED REALITY

BACKGROUND

The present application relates to augmented reality. More specifically, the present application relates to a computerized system and methodology to produce augmented reality presentations that may be manipulated in multiple ways.

Augmented reality may combine, or augment, a view of the physical world with computer-generated elements. For instance, a video of the physical world captured by a smart phone's camera may be overlaid with a computer-generated image when it is displayed on the smart phone's screen. This computer-generated image may be a still image or video. Additionally, augmented reality may be produced via other outputs, such as via a sound outputted by the smart phone.

In addition to a video of the physical world, other aspects of the physical world may be captured, and used to augment reality. These aspects include accelerometer data of a device, a position that the device is pointed based on compass data, and a physical location of the device based on GPS (Global Positioning System) data.

SUMMARY

In various embodiments, a computing device that implements an embodiment of the present disclosure may capture an image or video of a physical scene (and, in various embodiments, a video may be considered to comprise multiple images). The computing device may then identify a physical object within that physical scene, and that physical object may be, for example, a scale model of Earth. The computing device may then generate an overlay image based on the physical object, such as a computer-generated image of the Sun and Earth. The computing device may render a first augmented reality image that comprises the overlay image overlaid on the image of the physical scene, and display this image on a display.

Having rendered the first augmented reality image, the computing device may then receive user input indicative of modifying the first augmented reality image according to a first dimension, the dimension comprising complexity, variety, or depth. The computing device may then render a second augmented reality image based on the user input indicative of modifying the first augmented reality image according to the first dimension, and display this image on the display.

The computing device may then receive user input indicative of modifying the second augmented reality image according to a second dimension, the second dimension comprising complexity, variety, or depth. The computing device may then render a third augmented reality image based on the user input indicative of modifying the second augmented reality image according to the second dimension, and based on the user input indicative of modifying the first augmented reality image according to the first dimension, and display this image on the display.

DETAILED DESCRIPTION

Detailed embodiments of the claimed structures and methods are disclosed herein. However, it may be understood that the disclosed embodiments are merely illustrative of the claimed structures and methods that may be embodied in various forms. The present disclosure may, however, be embodied in many different forms and should not be construed as limited to the example embodiments set forth herein. Rather, these example embodiments are provided so that this disclosure will be thorough and complete and will fully convey the scope of the present disclosure to those skilled in the art. In the description, details of well-known features and techniques may be omitted to avoid unnecessarily obscuring the presented embodiments.

While some augmented reality techniques exist, they have disadvantages. Particularly as applied to learning an educational concept, such as in a field of math or science, many of these augmented reality techniques offer either too few representations of the concept, or too many, with little ability to navigate between multiple representations of the concept. For example, a concept to be taught may be the inter-relation of gravity between the Moon and Earth. There are augmented reality techniques that may represent this concept just one way, with just one or two levels of detail (e.g., one diagram of the Moon and Earth, and then a top-level concept that their gravitational pulls affect each other as one level of detail, and a second level of detail that shows the equation that controls this gravitational attraction). And there are augmented reality techniques that may represent this concept with too much information, which may lead to cognitive overload in the learner, and inhibit learning the concept.

Accordingly, the present disclosure provides for conveying multiple representations of a concept to a user via augmented reality, with a mechanism to easily move between these multiple representations along multiple axes (e.g., by providing variety to how the concept is expressed, by modifying the depth of the how the concept is expressed, and by modifying the complexity of how the concept is expressed). According to an embodiment of the present disclosure, a computer system, method, and computer readable product are provided for providing reactive overlays of multiple representations using augmented reality.

Presenting multiple representations in teaching a concept (such as the interrelation between the orbits of the Moon and Earth) may improve learning outcomes because they provide varying degrees of information from qualitative to quantitative descriptions that help deepen conceptual understanding. Presenting educational concept through augmented reality representations then leads to new possibilities in leveraging these multiple representations of a concept to facilitate learning. An additional way that augmented reality may aid in learning is that augmented reality allows for new metaphors and representations that are not possible in the physical world. Additionally, augmented reality provides a possibility of using physical world metaphors that can be touched and felt, overlaid with multiple digital representations, and can lead to more effective learning.

Figure 1:
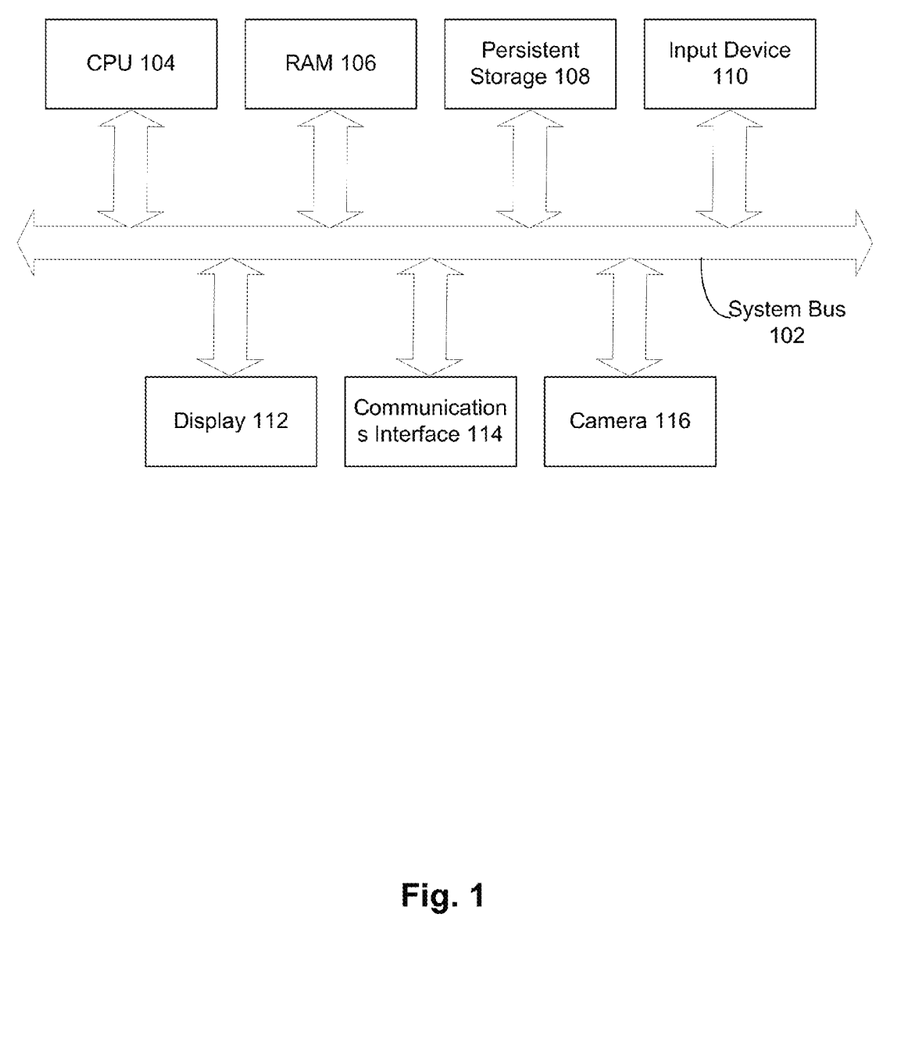
FIG. 1 is a block diagram that shows examples of hardware used according to embodiments of the present disclosure.

As shown in FIG. 1, a block diagram illustrates computer hardware that may be utilized to realize the system configuration and processing of the present disclosure for reactive overlays of multiple representations using augmented reality. CPU (central processing unit) 104, RAM (random access memory) 106, persistent storage 108, input device 110, display 112, communications interface 114, and camera 116 are connected to a system bus 102.

In FIG. 1, persistent storage 108, in an embodiment of the present disclosure, has capabilities that include storing a program that can execute the processes described herein. Persistent storage 108, in an embodiment of the present disclosure, can store an executing application that creates reactive overlays of multiple representations using augmented reality.

Figure 2:
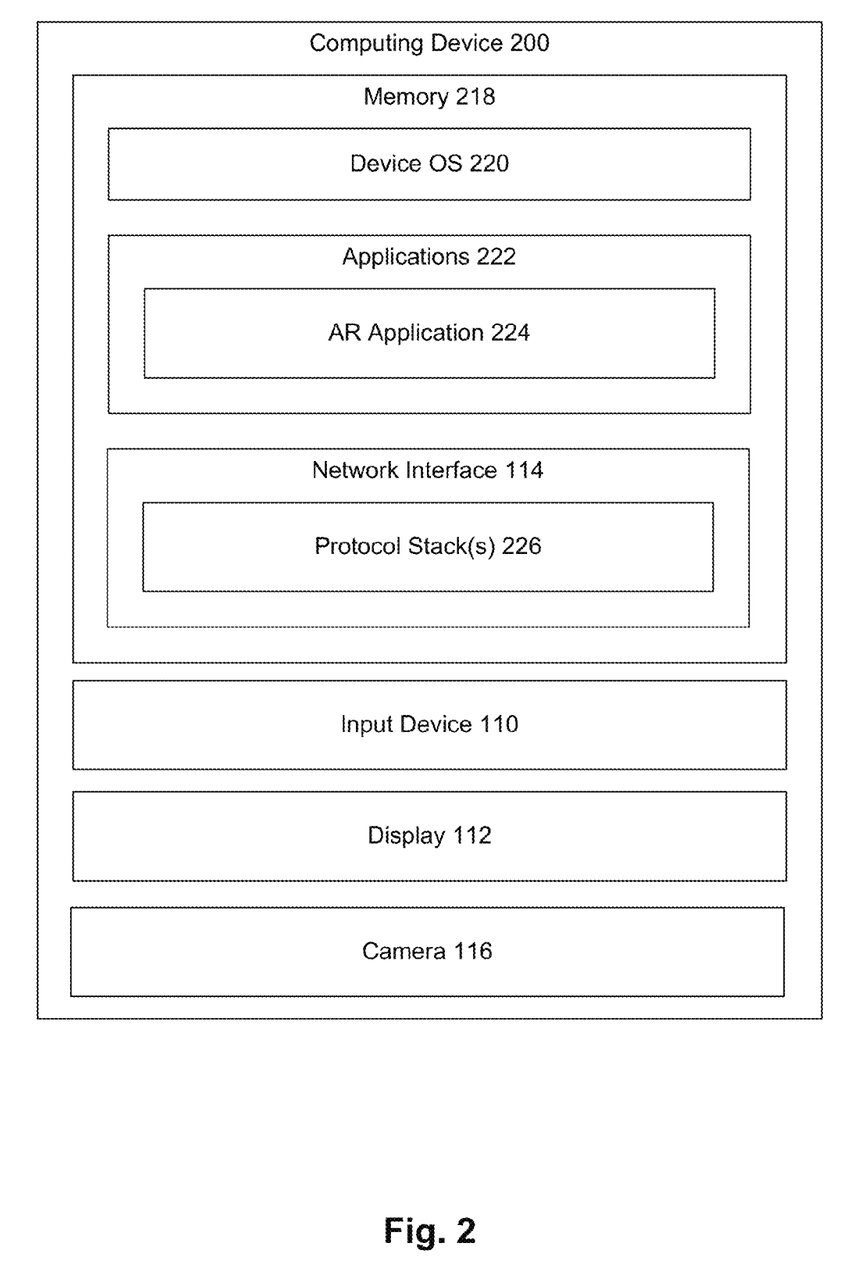
FIG. 2 is a representative diagram of computer components that may create reactive overlays of multiple representations using augmented reality.

Additionally, in FIG. 1, an input device, such as a touch screen coupled to display 112 that may include an onscreen keyboard may be used to manipulate graphic objects, such as icons, task bars and text boxes displayed on Display 114 in accordance with the graphic user interface provided by a device operating system (OS) 208 in FIG. 2. Display 112, in FIG. 1, in one embodiment of the present disclosure, may be an LCD (liquid crystal display) monitor panel. Display 112 is used, for example, to display an augmented reality image.

Communications interface 114, in FIG. 1, in one embodiment, is connected to a communications network using a WiFi (wireless-fidelity) or LTE (long-term evolution) network communications protocol. In the present disclosure, communications interface 114 receives processing requests in accordance with a communication protocol, for example TCP/IP (Transmission Control Protocol/Internet Protocol), from another computer (not shown), and processing results are sent to a third computer (not shown). As depicted, communications interface 114 may comprise hardware for transmitting and receiving network data, and/or processor-executable instructions for doing the same.

FIG. 2 is a representative diagram of computer components that may create reactive overlays of multiple representations using augmented reality. The computing device 200 may include at least one CPU 104, memory 216, input device 110, display 112, and camera 116. Additionally, memory 218 may comprise RAM 106 and/or persistent storage 108 of FIG. 1. Memory 218 may store device OS (operating system) 220, applications 222 (which may include augmented reality (AR) application 224), and communications interface 114 (which may include protocol stack(s) 226).

In various embodiments, applications 212 stored on computing device 200 may include, but are not limited to, user applications, as distinguished from operating system applications. During execution on computing device 200, each of applications 210 may be configured to cause computing device 200 to initiate data communications with other computing devices across a communications network.

Computing device 200 may be also configured to communicate over a network using a wireless and/or wired network access technology. Moreover, computing device 200 may be configured to run a device OS 220, which may be similar to a GOOGLE ANDROID or APPLE iOS operating system.

Each of the one or more of CPU 104 may include one or more central cores, and have multiple arithmetic logic units (ALUs) that perform arithmetic and logical operations, as well as one or more control units (CUs) that extract instructions and stored content from processor cache-level memory, and then executes instructions by calling on the ALUs during program execution. In some embodiments, CPU 104 may be configured to execute each of the applications 222 stored in the memory 218. In various embodiments, communications interface 114 may be configured to detect an action (e.g., operation, command, user input) directed to one of the applications 222, the action triggering the generation of a data transfer request and a transmission of the data transfer request.

Also shown in FIG. 2 is an example of the computing device 200 having an AR application that allows for reactive overlays of multiple representations using augmented reality. In some embodiments, an image of the physical world may be captured with camera 116 in response to an indication of user input received at input device 110. Then, AR application 224, as executed on CPU 104, may identify an object in the image, determine an overlay to present on top of that image, align the overlay and the image, and present this overlay image on display 112.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible and/or non-transitory device that may retain and store instructions for use by an instruction execution device. For example, the computer readable storage medium may be, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD, alternatively known as a digital video disc), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as a Smalltalk or C++ programming language or the like, and conventional procedural programming languages, such as a C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an (ISP) Internet Service Provider). In some embodiments, electronic circuitry including, for example, programmable logic circuitry, field-programmable gate arrays (FPGA), or programmable logic arrays (PLA), may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure, and these illustrations may comprise one or more operating procedures. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
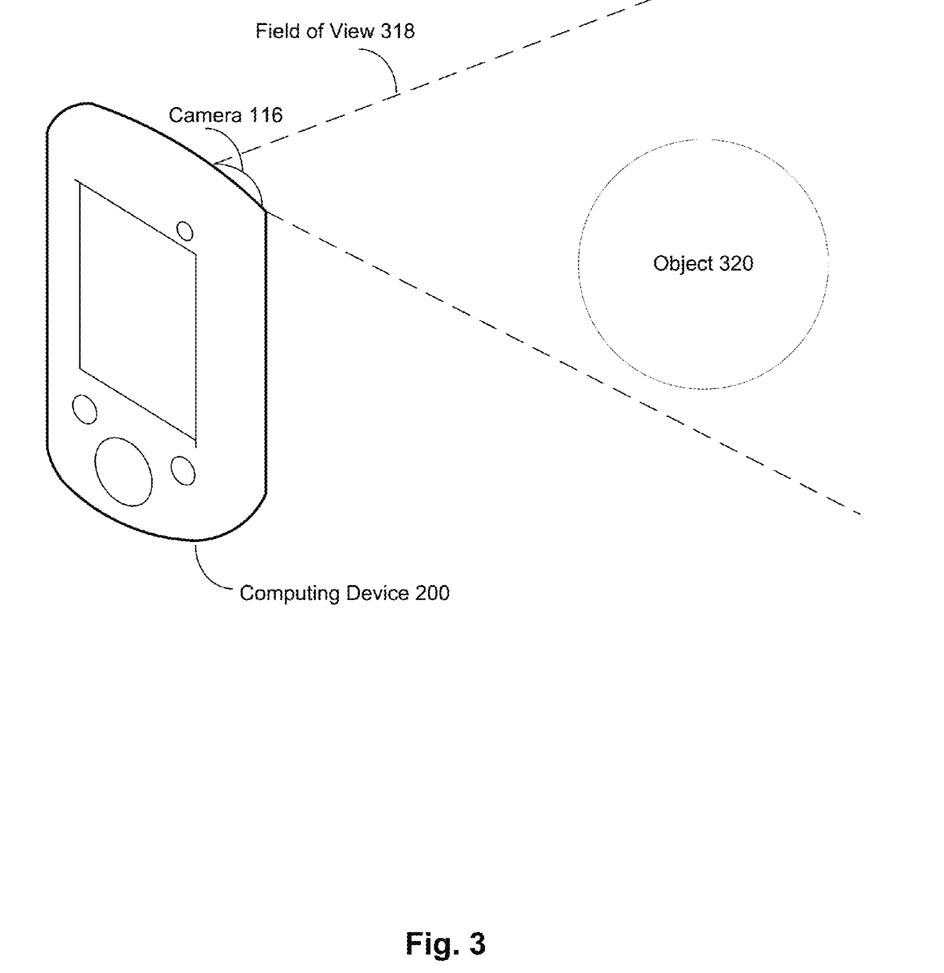
FIG. 3 illustrates a computing device capturing an image of a physical scene to produce an augmented reality image.

FIG. 3 illustrates a computing device capturing an image of a physical scene to produce an augmented reality image, and this computing device may be computing device 200 of FIG. 2. For example, in FIG. 3, computing device 200 of FIG. 2 may be utilized to capture this image of a physical scene. As depicted in FIG. 3, computing device 200 has camera 116, which has a field of view 318 that contains what may be captured by camera 116. Here, field of view 318 contains object 320, so when computing device 200 captures an image of a physical scene, this image will include object 320. In various embodiments, object 320 may be a physical object, such as a globe, or printed material, such as an image in a book.

Figure 4:
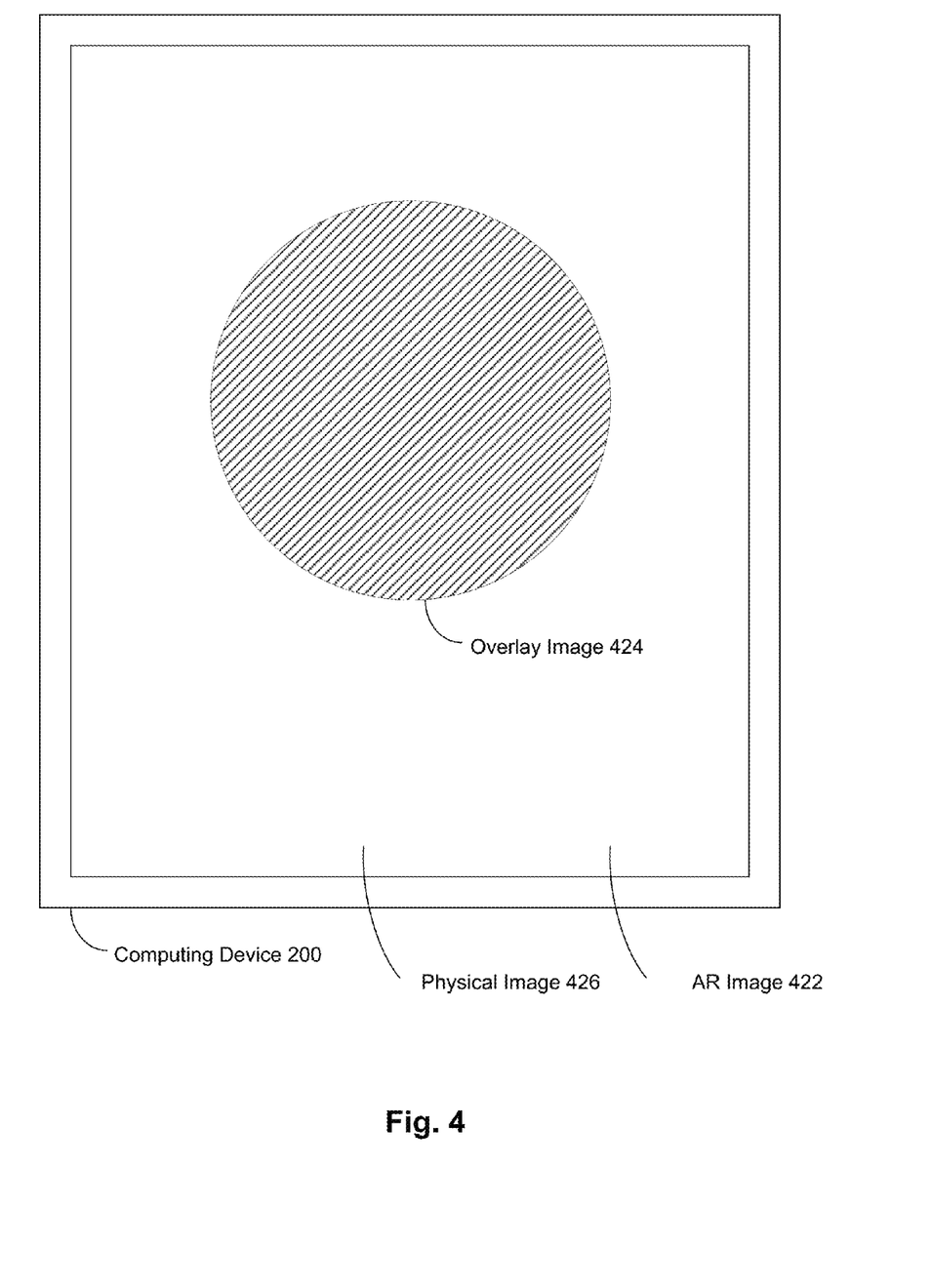
FIG. 4 illustrates an augmented reality image produced by a computing device after capturing an image of a physical scene in FIG. 3.

FIG. 4 illustrates an augmented reality image produced by a computing device after capturing an image of a physical scene in FIG. 3. Here, computing device 200 has already captured an image of a physical scene, as described with respect to FIG. 3, and has produced augmented reality image 422, which is made up of overlay image 424 and physical image 426. It may be noted that augmented reality image 422 is depicted as including all that is shown by the display of computing device, including overlay image 424. And then, physical image 426 excludes overlay image 424.

Physical image 426 is an image of the physical scene. Then, overlay image 424 is a computer-generated image produced by the computing device based on that image of the physical scene. It may be noted that this computer-generated image may be an image of a physical scene that has been captured in the past and stored by the computing device until it is used here to generate an augmented reality image in combination with physical image 426.

For example, in determining to generate and/or use overlay image 424, computing device 200 may have determined that object 320 in FIG. 3 is a globe, or other representation of the Earth. Based on that, computing device 200 may create overlay image 424 to be a computer-generated image of the Earth, which may be manipulated by a user (such as rotated about its axis in response to user input). This overlay image 424 is overlaid upon physical image 426 so that it may occlude part or all of physical image 426, such as by occluding part or all of object 320 with overlay image 424, which is generated based on object 320.

Figure 5:
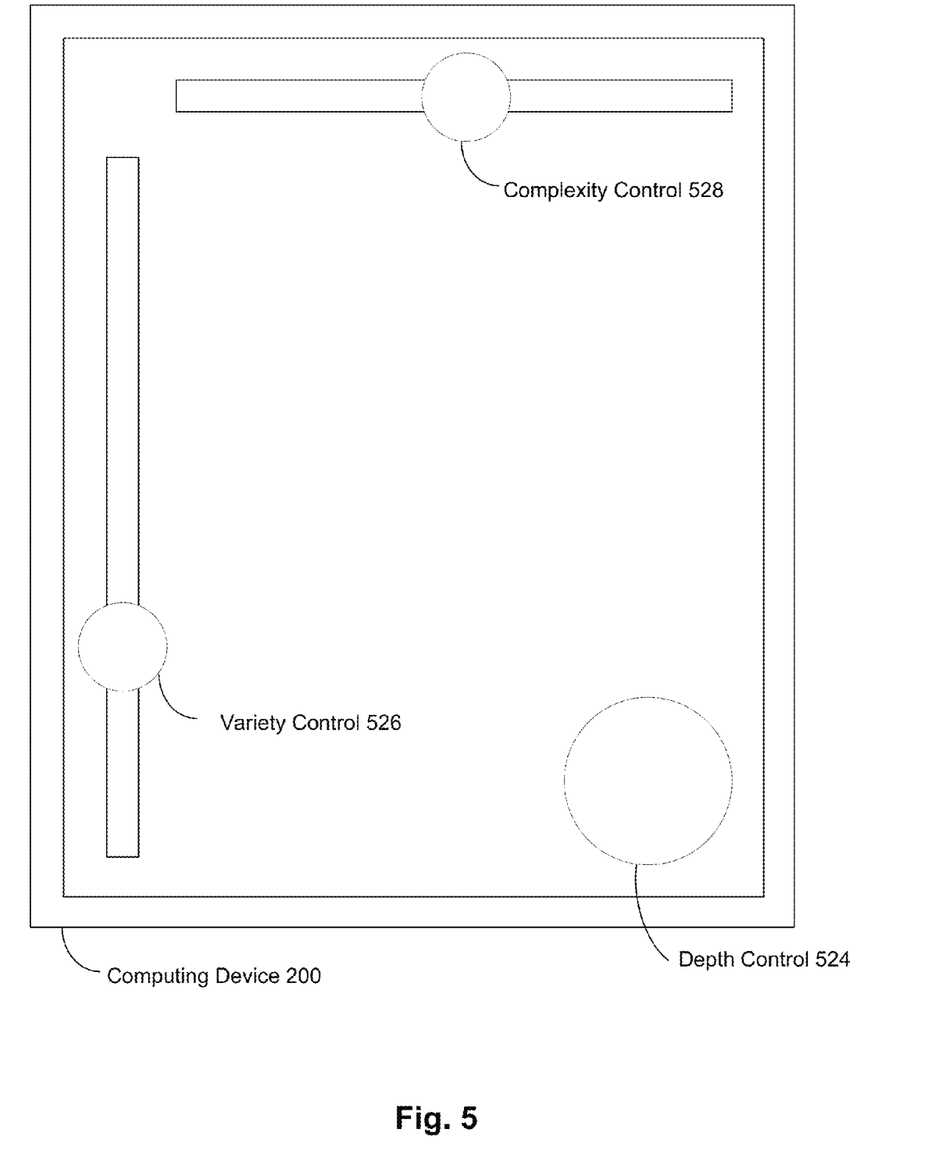
FIG. 5 illustrates example user interface elements that may be used to switch between multiple representations of the augmented reality image of FIG. 4.

FIG. 5 illustrates example user interface elements that may be used to switch between multiple representations of the augmented reality image of FIG. 4. In various embodiments, these example user interface elements may be overlaid on physical image 426 of FIG. 4. As depicted, computing device 200 displays on its display augmented reality image 522, which includes three user interface elements—depth control 524, variety control 526, and complexity control 528. As depicted, depth control 524 is a knob that may be used to increase or decrease the complexity of the concept being conveyed in the augmented reality image 522, by rotating the knob clockwise or counterclockwise, respectively. Variety control 524 is a slider that may be used to change how the concept being conveyed in the augmented reality image 522, by moving the slider up or down. Then complexity control 528 is a slider that may be used to increase or decrease the complexity of the concept being conveyed in the augmented reality image, by moving the slider to the right or left, respectively.

Figure 6:
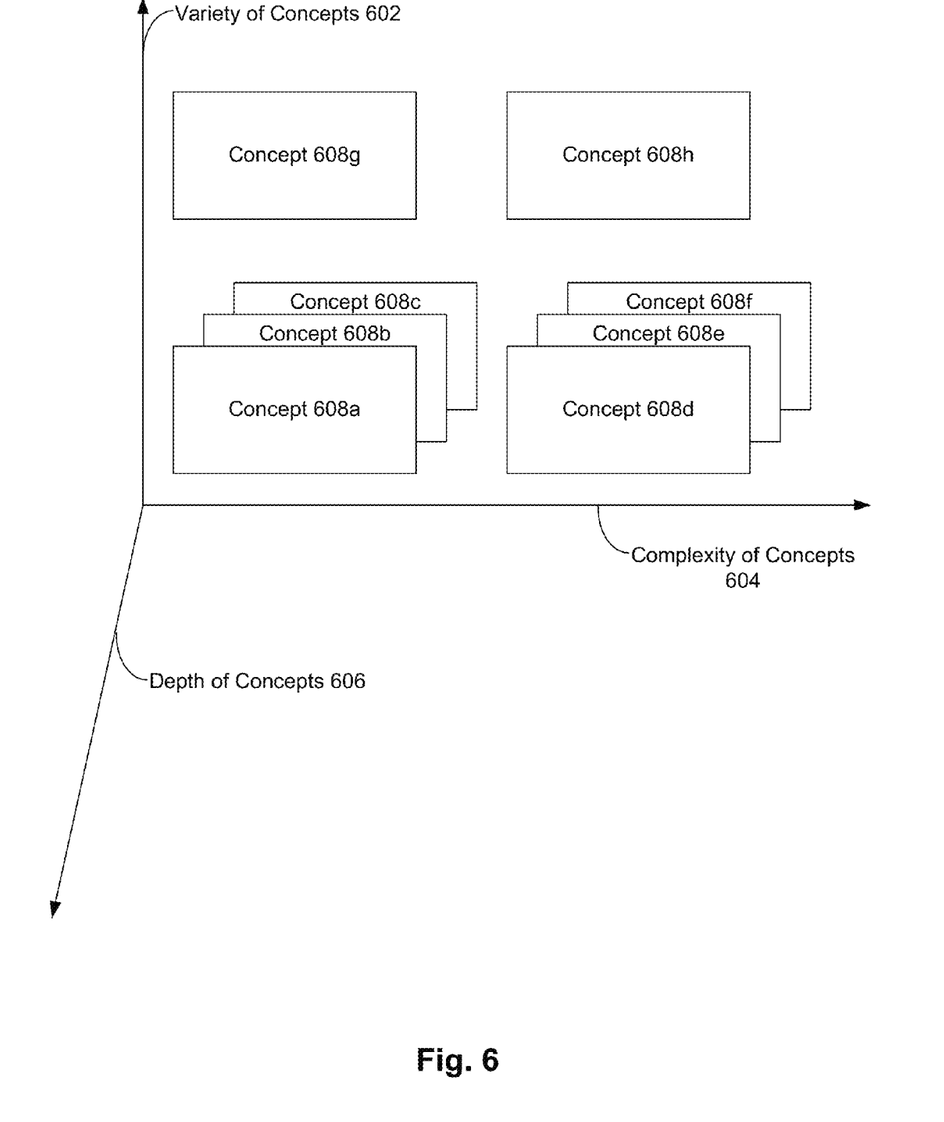
FIG. 6 illustrates how a concept may be conveyed via a variety of interrelated augmented reality images along multiple dimensions.

FIG. 6 illustrates how a concept may be conveyed via a variety of interrelated augmented reality images along multiple dimensions. While FIG. 6 illustrates that there are three dimensions, it may be appreciated that these three dimensions are presented for illustrative purposes. That is, there may be embodiments where a concept may be conveyed via a variety of augmented reality images along more or fewer than three dimensions. For example, these different representations 608a, 608b, 608c, 608d, 608e, 608f, 608g, and 608h may be displayed by computing device 200 one at a time. Then, user input received by computing device 200 (such as via user input at depth control 524, variety control 526, and complexity control 528 of FIG. 5) may be used to direct computing device 200 to move between these representations.

These representations are displayed here logically as being placed within a three-dimensional space, where the three axes are variety of concepts 602, depth of concepts 604, and complexity of concepts 606. Where the representation currently being displayed is representation 608a, and the depth of the representation is modified, the representation being displayed may be changed to representation 608b. Where the representation currently being displayed is representation 608a and the complexity of the representation is modified, the representation being displayed may be changed to representation 608d. Then where the representation currently being displayed is representation 608a and the variety is modified, the representation being displayed may be changed to representation 608g.

It may be appreciated that each of these dimensions may be modified independently. Say, for example, that there are three levels for each of depth, complexity, and variety. So, for each level of depth, there may be nine different augmented reality presentations—representing the nine possibilities for each of the combinations of the three levels of complexity and three types of variety. That is, in this example, while at a given level of depth, the augmented reality image may be displayed with one of three different levels of complexity and with one of three different types of variety.

Figure 7:
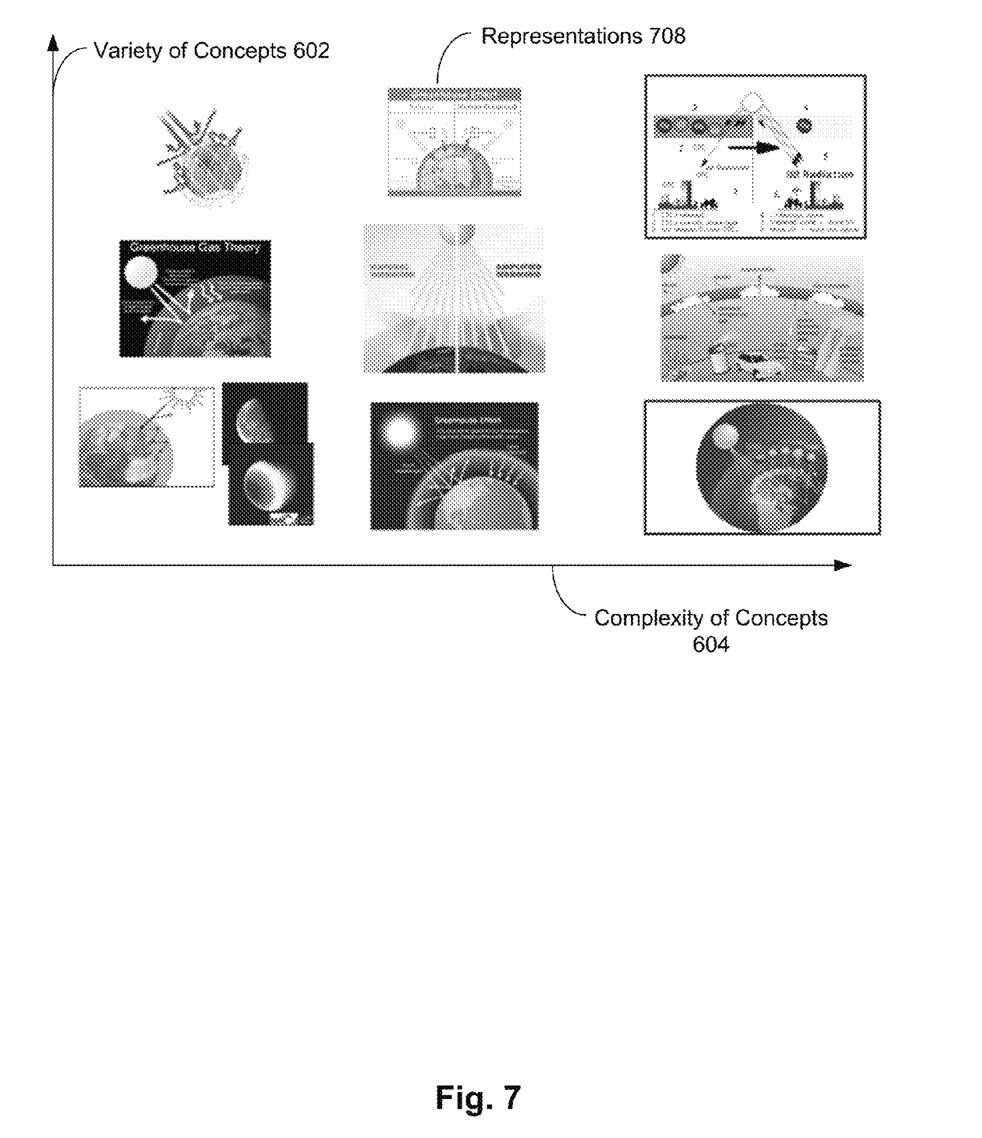
FIG. 7 illustrates examples of multiple dimensions of augmented reality images that convey the atmosphere effects of the Moon and Earth.

FIG. 7 illustrates examples of multiple dimensions of augmented reality images that convey the atmosphere effects of the Moon and Earth. These representations may be the representations 608 of FIG. 6 as applied to the atmosphere effects of the Moon and Earth. As can be seen, for each level of complexity of the multiple representations 708, there are three different varieties that may be presented. And for each type of variety, there are three different complexities that may be presented.

Figure 8:
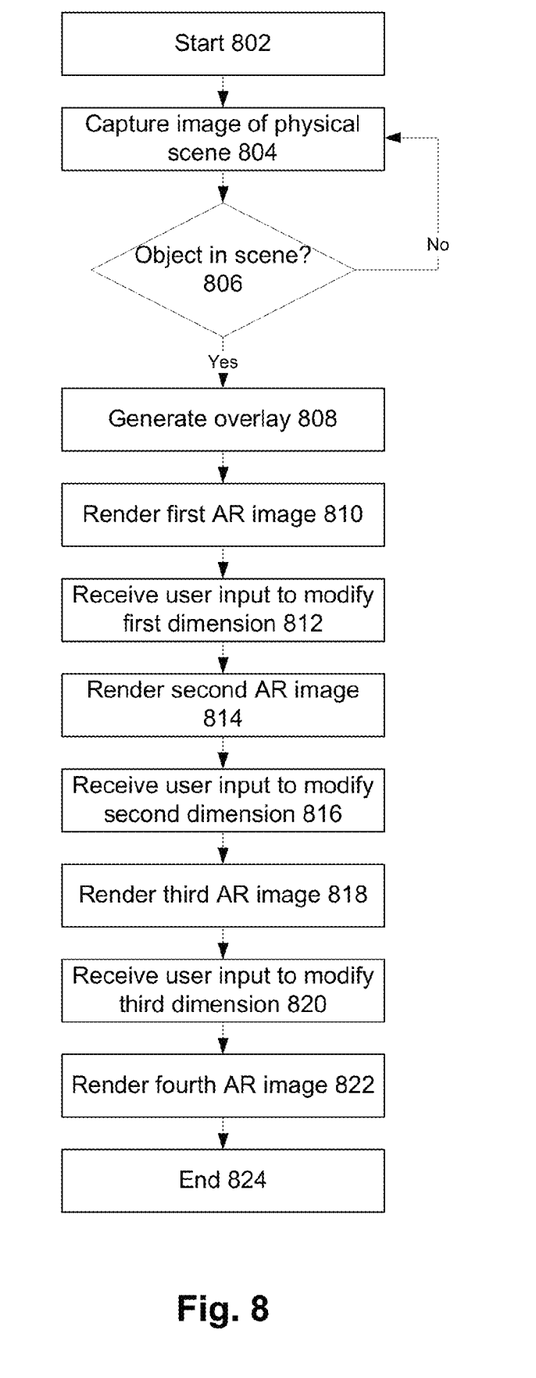
FIG. 8 illustrates example operating procedures for presenting reactive overlays of multiple representations using augmented reality.

FIG. 8 illustrates example operating procedures for presenting reactive overlays of multiple representations using augmented reality. In various embodiments, the operating procedures of FIG. 8 may be implemented by computing device 200 to create an augmented reality image as described with respect to FIGS. 3 and 4, to display the user interface elements described with respect to FIG. 5, and to switch between multiple representations in augmented reality images as described with respect to FIGS. 6-7.

It may be appreciated that the operating procedures of FIG. 8 (and FIG. 9) present an example embodiment, and that there may be embodiments that implement more or fewer operating procedures than depicted here, or implement the operating procedures depicted here in a different order than as depicted. For example, there may be embodiments that omit operating procedures 818 and 820. And there may be embodiments that have an operation between operation 808 and 810 where the overlay image of operation 808 is aligned on the image of the physical scene of operation 804. Additionally, In various embodiments, two or more of the operations may be performed substantially concurrently.

The operating procedures of FIG. 8 begin with operation 802 and then move to operation 804. Operation 804 depicts capturing an image of a physical scene. In various embodiments, this may comprise camera 116 of computing device 200 capturing an image of a physical scene as described with respect to FIG. 3. In various embodiments, operation 804 may comprise capturing an image of a physical scene with a computing device. After operation 804, the operating procedures of FIG. 8 move to operation 806.

Operation 806 depicts determining whether there is a recognizable object in the scene for which an augmented reality image may be generated. In various embodiments, this may comprise applying object recognition techniques to the image captured in operation 804. These object recognition techniques may indicate whether an object is present in the captured image that may be used for augmented reality. For example, both a globe and a chair are objects that may be recognized. However, In various embodiments, it may be that the globe is recognized as being able to be used for augmented reality (such as by presenting concepts relating to the Earth's orbit), whereas augmented reality concepts have not been implemented in computing device 200 as applied to chairs. In various embodiments, operation 804 may comprise identifying a physical object within the physical scene.

If in operation 806 it is determined that there is a recognizable object in the scene for which an augmented reality image may be generated, then the operating procedures of FIG. 8 move to operation 808. If, instead, in operation 806 it is determined that there is not a recognizable object in the scene for which an augmented reality image may be generated, then the operating procedures of FIG. 8 return to operation 804 to capture an image of a physical scene where a recognizable object is present.

Operation 808 is reached from operation 806 where it is determined that there is a recognizable object in the scene for which an augmented reality image may be generated. Operation 808 depicts generating an overlay image. Generating an overlay image may comprise accessing a stored database of computer-generated images and selecting one based on identifying the object, as well as the selected type of variety, and/or level of complexity and depth (along with any other dimensions of representation that may be available).

In various embodiments, operation 808 may comprise generating an overlay image based on the physical object. In various embodiments, operation 808 may comprise aligning the overlay image with the image of the physical scene before rendering the first augmented reality image. For example, aligning the overlay image may comprise setting a position of the overlay image relative to the image of the physical scene such that an image of the Earth in the overlay image is placed over a globe of the Earth captured in the image of the physical scene. After operation 808, the operating procedures of FIG. 8 move to operation 810.

Operation 810 depicts rendering an augmented reality image. This augmented reality image may comprise the overlay image of operation 808 overlaid upon the image of the physical scene of operation 804. In various embodiments, operation 810 may comprise rendering, on a display of the computing device, a first augmented reality image comprising the overlay image overlaid on the image of the physical scene. In various embodiments, operation 810 may comprise rendering a first augmented reality image.

In various embodiments, operation 810 may comprise rendering a first user interface element, wherein receiving an indication of user input at the first user interface element is indicative of modifying the first augmented reality image according to a first dimension, and rendering a second user interface element, wherein receiving an indication of user input at the second user interface element is indicative of modifying the second augmented reality image according to the second dimension.

In various embodiments, the augmented reality image may comprise an image of a real-world space overlaid with a computer-generated image, the computer-generated image comprising an animation. In various embodiments, the augmented reality image may comprise an image of a real-world space overlaid with a computer-generated image, the computer-generated image comprising a user-interface element that may be manipulated in response to an indication of user input received by the computer system. In various embodiments, the user-interface element may comprise a knob or a slider. After operation 810, the operating procedures of FIG. 8 move to operation 812.

Operation 812 depicts receiving user input to modify the augmented reality image along a first dimension. For example, this may be user input received at one of the user interface elements of FIG. 5. In various embodiments, the first dimension may comprise one of a complexity, a variety, and a depth of a concept conveyed by the first augmented reality image. It may be appreciated that there may be other dimensions on which the augmented reality image may be modified.

In various embodiments, operation 812 may comprise receiving user input indicative of modifying the first augmented reality image according to a first dimension, the dimension comprising complexity, variety, or depth. In various embodiments, operation 812 may comprise receiving user input indicative of modifying the first augmented reality image according to a first dimension. After operation 812, the operating procedures of FIG. 8 move to operation 814.

Operation 814 depicts rendering a second augmented reality image based on modifying the augmented reality image along the first dimension. In various embodiments, operation 814 may comprise rendering, on the display of the computing device, a second augmented reality image based on the user input indicative of modifying the first augmented reality image according to the first dimension. In various embodiments, operation 814 may comprise rendering a second augmented reality image based on the user input indicative of modifying the first augmented reality image according to the first dimension. After operation 814, the operating procedures of FIG. 8 move to operation 816.

Operation 816 depicts receiving user input to modify the augmented reality image along a second dimension. In various embodiments, operation 816 may be implemented in a similar manner as operation 812. For example, were user input to modify the complexity of the augmented reality image received in operation 812, this may comprise receiving user input to modify the depth of the augmented reality image. In various embodiments, operation 816 may comprise receiving user input indicative of modifying the second augmented reality image according to a second dimension, the second dimension comprising complexity, variety, or depth, the second dimension differing from the first dimension. In various embodiments, operation 816 comprises receiving user input indicative of modifying the second augmented reality image according to a second dimension. After operation 816, the operating procedures of FIG. 8 move to operation 818.

Operation 818 depicts rendering a third augmented reality image based on modifying the augmented reality image along the second dimension. In various embodiments, operation 818 may be implemented in a similar manner as operation 816. Here, the modified first dimension of operation 814 may be held constant and this second dimension is modified. For example, if in operation 814, the complexity was modified from Low to Medium, while the depth was unchanged at Low, the augmented reality image would be rendered with Medium complexity and Low depth. Then, if in operation 816, the depth was modified from Low to High, here in operation 818, the augmented reality image would be rendered with Medium complexity (as that has not changed) and High depth.

In various embodiments, operation 818 may comprise rendering, on the display of the computing device, a third augmented reality image based on the user input indicative of modifying the second augmented reality image according to the second dimension, and based on the user input indicative of modifying the first augmented reality image according to the first dimension.

In various embodiments, operation 818 may comprise rendering a third augmented reality image based on the user input indicative of modifying the second augmented reality image according to the second dimension, and based on the user input indicative of modifying the first augmented reality image according to the first dimension. After operation 818, the operating procedures of FIG. 8 move to operation 820.

Operation 820 depicts receiving user input to modify the augmented reality image along a third dimension. In various embodiments, operation 820 may be implemented in a similar manner as operation 812. In various embodiments, operation 820 may comprise receiving user input indicative of modifying the third augmented reality image according to a third dimension, the second third comprising complexity, variety, or depth, the third dimension differing from each of the first dimension and the second dimension. After operation 820, the operating procedures of FIG. 8 move to operation 822.

Operation 822 depicts rendering a fourth augmented reality image based on modifying the augmented reality image along the third dimension. In various embodiments, operation 822 may be implemented in a similar manner as operation 820.

In various embodiments, operation 822 may comprise rendering, on the display of the computing device, a fourth augmented reality image based on the user input indicative of modifying the third augmented reality image according to the third dimension, based on the user input indicative of modifying the second augmented reality image according to the second dimension, and based on the user input indicative of modifying the first augmented reality image according to the first dimension. After operation 822, the operating procedures of FIG. 8 move to operation 824, where the operating procedures of FIG. 8 end.

Figure 9:
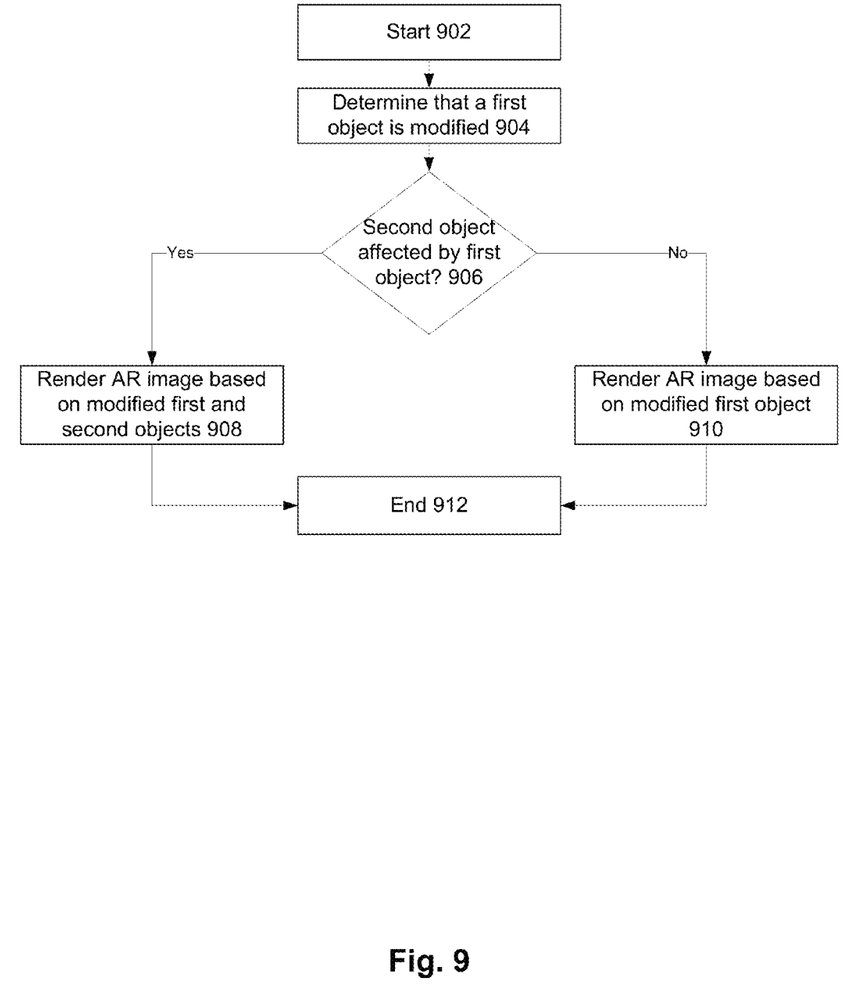
FIG. 9 illustrates example operating procedures for presenting reactive overlays using augmented reality where elements of a reactive overlay are interrelated.

FIG. 9 illustrates example operating procedures for presenting reactive overlays using augmented reality where elements of a reactive overlay are interrelated. In various embodiments, the operating procedures of FIG. 9 may be implemented by computing device 200 in conjunction with the operating procedures of FIG. 8.

For example, as dimensions of complexity, depth, and variety are modified as in the operating procedures of FIG. 8, a user may provide input to modify an aspect of one of two interrelated objects in an overlay image. Then, computing device 200 may determine that modifying an aspect of one of these two interrelated objects may result in modifying an aspect of the other of the two interrelated objects. For example, if an augmented reality image comprises the Moon and the Earth, if a user provides input to increase the mass of the Moon, this increased mass of the Moon may affect the Earth's ocean tides. Or if the temperature of the Sun is increased, this may affect the Earth's atmosphere. By showing how a change in one object affects other aspects of what is modeled, it may be easier for a user to learn these causes and effects.

The operating procedures of FIG. 9 begin with operation 902 and then move to operation 904. Operation 904 depicts determining that a first object of an augmented reality image has been modified.

In various embodiments, operation 904 may comprise determining that a parameter of a first object in the second augmented reality image has been modified relative to the first augmented reality image. For example, this may involve having determined that the mass of the Moon (as modeled here) has been increased in response to user input. After operation 904, the operating procedures of FIG. 9 move to operation 906.

Operation 906 depicts determining whether modifying the first object affects a second object of the augmented reality image. In various embodiments, operation 906 may comprise determining that the parameter of the first object affects a parameter of a second object in the second augmented reality image. These two parameters may be the aforementioned mass of the Moon and tides of the Earth, or temperature of the Sun and atmosphere of the Earth. In various embodiments, a relationship between the first object and the second object is maintained in a concept graph comprising at least one pair that identifies a parameter and a corresponding effect. And operation 906 may comprise parsing the concept graph to determine that the parameter of the first object affects the parameter of the second object in the second augmented reality image.

If in operation 906 it is determined that modifying the first object affects a second object of the augmented reality image, the operating procedures of FIG. 9 move to operation 908. If, instead, in operation 906 it is determined that modifying the first object does not affect a second object of the augmented reality image, the operating procedures of FIG. 9 move to operation 910.

Operation 908 is reached from operation 906 where it is determined that modifying the first object affects a second object of the augmented reality image. Operation 908 depicts rendering an augmented reality image based on the modified first and second objects. Returning to the example of changing the modeled mass of the Moon, this may comprise rendering the augmented reality image both with an increased mass of the Moon (which may be the first object here), and modified tides of the Earth (which may be the second object here).

In various embodiments, input indicative of a relationship between a first object and a second object of the first augmented reality image may be received, such as a file uploaded by a user that defines this relationship. In various embodiments, this relationship may comprise a concept graph that expresses the relationship between the first object and the second object of the first augmented reality image in one or more pairs of parameters and elements. In embodiments, the concept graph may convey a containment relationship within an object—for example, that changing the mass of a modeled planet affects its orbit. The concept graph may also convey a sequential, or dependency, relationship between two objects—for example, that changing the temperature of a modeled Sun may affect the atmospheric temperature of a modeled Earth. In such embodiments, operation 908 may comprise rendering the second augmented reality image comprises modifying the first object, and determining how to modify the second object based on the relationship between the first object and the second object.

In various embodiments, operation 908 may comprise rendering the second augmented reality image based on the parameter of the second object as affected by the parameter of the first object. After operation 908, the operating procedures of FIG. 9 move to operation 912 where the operating procedures of FIG. 9 end.

Operation 910 is reached from operation 906 where it is determined that modifying the first object does not a second object of the augmented reality image. Operation 910 depicts rendering an augmented reality image based on the modified first object. So, for example, where a change is made to a first object and this change does not affect any other objects, the augmented reality image is generated to reflect a change in the first object but not any other objects. An example may be changing the composition of the Earth's atmosphere. While changing the composition of the Earth's atmosphere may affect aspects of Earth, such as its average temperature, where this does not affect the mass of the Earth, this may have no effect on other modeled objects like the Sun and Moon (where changing the mass of the Earth would at least affect the orbit of the Moon). In other embodiments, the atmosphere of the Earth and the temperature of the Earth may be considered to be different objects, or parameters of one object. In this case, so changing one, which results in changing another, may be processed as in accordance with operation 908.

After operation 910, the operating procedures of FIG. 9 move to operation 912 where the operating procedures of FIG. 9 end.

Detailed embodiments of the claimed structures and methods are disclosed herein. However, it can be understood that the disclosed embodiments are merely illustrative of the claimed structures and methods that may be embodied in various forms. The present disclosure may, however, be embodied in many different forms and should not be construed as limited to the example embodiments set forth herein. Rather, these example embodiments are provided so that this disclosure will be thorough and complete and will fully convey the scope of the present disclosure to those skilled in the art. In the description, details of well-known features and techniques may be omitted to avoid unnecessarily obscuring the presented embodiments.

What is claimed is:

1. A method for manipulating multiple dimensions of an augmented reality image, comprising:
   capturing an image of a physical scene with a computing device;
   identifying a physical object within the physical scene;
   generating an overlay image based on the physical object;
   rendering, on a display of the computing device, a first augmented reality image comprising the overlay image overlaid on the image of the physical scene;
   receiving user input indicative of modifying the first augmented reality image according to a first dimension, the dimension comprising complexity, variety, or depth of a concept;
   rendering, on the display of the computing device, a second augmented reality image based on the user input indicative of modifying the first augmented reality image according to the first dimension;
   receiving user input indicative of modifying the second augmented reality image according to a second dimension, the second dimension comprising complexity, variety, or depth of the concept, the second dimension differing from the first dimension;
   rendering, on the display of the computing device, a third augmented reality image based on the user input indicative of modifying the second augmented reality image according to the second dimension, and based on the user input indicative of modifying the first augmented reality image according to the first dimension;
   receiving user input indicative of modifying the third augmented reality image according to a third dimension, the third dimension comprising complexity, variety, or depth of the concept, the third dimension differing from each of the first dimension and the second dimension; and
   rendering, on the display of the computing device, a fourth augmented reality image based on the user input indicative of modifying the third augmented reality image according to the third dimension, based on the user input indicative of modifying the second augmented reality image according to the second dimension, and based on the user input indicative of modifying the first augmented reality image according to the first dimension.

2. A method for manipulating multiple dimensions of an augmented reality image, comprising:
   capturing an image of a physical scene with a computing device;
   identifying a physical object within the physical scene;
   generating an overlay image based on the physical object;
   rendering, on a display of the computing device, a first augmented reality image comprising the overlay image overlaid on the image of the physical scene;
   receiving user input indicative of modifying the first augmented reality image according to a first dimension, the dimension comprising complexity, variety, or depth of a concept;
   rendering, on the display of the computing device, a second augmented reality image based on the user input indicative of modifying the first augmented reality image according to the first dimension;
   receiving user input indicative of modifying the second augmented reality image according to a second dimension, the second dimension comprising complexity, variety, or depth of the concept, the second dimension differing from the first dimension; and
   rendering, on the display of the computing device, a third augmented reality image based on the user input indicative of modifying the second augmented reality image according to the second dimension, and based on the user input indicative of modifying the first augmented reality image according to the first dimension, wherein rendering the second augmented reality image based on the user input indicative of modifying the first augmented reality image according to the first dimension comprises:
   determining that a parameter of a first object in the second augmented reality image has been modified relative to the first augmented reality image;
   determining that the parameter of the first object affects a parameter of a second object in the second augmented reality image; and
   rendering the second augmented reality image based on the parameter of the second object as affected by the parameter of the first object.

3. The method of claim 2, wherein a relationship between the first object and the second object is maintained in a concept graph comprising at least one pair that identifies a parameter and a corresponding effect.

4. The method of claim 3, wherein determining that the parameter of the first object affects the parameter of the second object in the second augmented reality image comprises: parsing the concept graph to determine that the parameter of the first object affects the parameter of the second object in the second augmented reality image.

5. The method of claim 2, further comprising: aligning the overlay image with the image of the physical scene before rendering the first augmented reality image.

6. The method of claim 2, wherein rendering the first augmented reality image comprises:
   rendering a first user interface element, wherein receiving the indication of user input at the first user interface element is indicative of modifying the first augmented reality image according to the first dimension; and
   rendering a second user interface element, wherein receiving the indication of user input at the second user interface element is indicative of modifying the second augmented reality image according to the second dimension.

7. A computer system, comprising:
   one or more processors, one or more computer-readable memories, one or more computer-readable tangible storage devices, and program instructions stored on at least one of the one or more storage devices for execution by at least one of the one or more processors via at least one of the one or more memories, wherein the computer system is configured to:
   render a first augmented reality image;
   receive user input indicative of modifying the first augmented reality image according to a first dimension;
   render a second augmented reality image based on the user input indicative of modifying the first augmented reality image according to the first dimension;

receive user input indicative of modifying the second augmented reality image according to a second dimension;

render a third augmented reality image based on the user input indicative of modifying the second augmented reality image according to the second dimension, and based on the user input indicative of modifying the first augmented reality image according to the first dimension; and receive input indicative of a relationship between a first object and a second object of the first augmented reality image, wherein rendering the second augmented reality image comprises modifying the first object, and determining how to modify the second object based on the relationship between the first object and the second object.

8. The computer system of claim 7, wherein the augmented reality image comprises an image of a real-world space overlaid with a computer-generated image, the computer-generated image comprising an animation.

9. The computer system of claim 7, wherein the augmented reality image comprises an image of a real-world space overlaid with a computer-generated image, the computer-generated image comprising a user-interface element that may be manipulated in response to an indication of user input received by the computer system.

10. The computer system of claim 9, wherein the user-interface element comprises a knob or a slider.

11. The computer system of claim 7, wherein the computer system is further configured to:

receive input indicative of a concept graph that expresses the relationship between the first object and the second object of the first augmented reality image in one or more pairs of parameters and elements.

12. The computer system of claim 7, wherein the first dimension comprises one of a complexity, a variety, and a depth of a concept conveyed by the first augmented reality image.

13. A computer program product, comprising: a computer readable storage medium having programming instructions embodied therewith, the program instructions executable by a computer cause the computer to:

render a first augmented reality image;

receive user input indicative of modifying the first augmented reality image according to a first dimension;

render a second augmented reality image based on the user input indicative of modifying the first augmented reality image according to the first dimension;

receive user input indicative of modifying the second augmented reality image according to a second dimension;

render a third augmented reality image based on the user input indicative of modifying the second augmented reality image according to the second dimension, and based on the user input indicative of modifying the first augmented reality image according to the first dimension;

receive user input indicative of modifying the third augmented reality image according to a third dimension; and render a fourth augmented reality image based on the user input indicative of modifying the third augmented reality image according to the third dimension, based on the user input indicative of modifying the second augmented reality image according to the second dimension, and based on the user input indicative of modifying the first augmented reality image according to the first dimension.

14. The computer program product of claim 13, wherein a relationship between the first object and the second object is maintained in a concept graph comprising at least one pair that identifies a parameter and a corresponding effect.

15. The computer program product of claim 13, wherein the program instructions executable by the computer further cause the computer to:

parse the concept graph to determine that the parameter of the first object affects the parameter of the second object in the second augmented reality image.

16. The computer program product of claim 13, wherein the program instructions executable by the computer further cause the computer to:

align the overlay image with the image of the physical scene before rendering the first augmented reality image.

17. A computer program product, comprising: a computer readable storage medium having programming instructions embodied therewith, the program instructions executable by a computer cause the computer to:

render a first augmented reality image;

receive user input indicative of modifying the first augmented reality image according to a first dimension;

render a second augmented reality image based on the user input indicative of modifying the first augmented reality image according to the first dimension;

receive user input indicative of modifying the second augmented reality image according to a second dimension;

render a third augmented reality image based on the user input indicative of modifying the second augmented reality image according to the second dimension, and based on the user input indicative of modifying the first augmented reality image according to the first dimension;

determine that a parameter of a first object in the second augmented reality image has been modified relative to the first augmented reality image;

determine that the parameter of the first object affects a parameter of a second object in the second augmented reality image; and render the second augmented reality image based on the parameter of the second object as affected by the parameter of the first object.

* * * * *